United States Patent [19]

Varga

[11] E Re. 29,503

[45] Reissued Dec. 27, 1977

[54] APPARATUS FOR USE AS A GAS COMPRESSOR OR BLOWER

[75] Inventor: John Maximilian Jules Varga, Halifax, England

[73] Assignee: Carding Specialists (Canada) Limited, Toronto, Canada

[21] Appl. No.: 768,357

[22] Filed: Feb. 14, 1977

Related U.S. Patent Documents

Reissue of:

[64] Patent No.: 3,930,762
Issued: Jan. 6, 1976
Appl. No.: 377,795
Filed: July 9, 1973

[30] Foreign Application Priority Data

July 11, 1972 United Kingdom ..... 32296/72

[51] Int. Cl.[2] ..... F04B 7/06; F04B 39/02
[52] U.S. Cl. ..... 417/492; 417/254
[58] Field of Search ..... 417/492, 493, 254, 501, 417/500; 74/22 R

[56] References Cited

U.S. PATENT DOCUMENTS

| | | | |
|---|---|---|---|
| 1,729,430 | 9/1929 | Machtolf | 417/254 |
| 2,422,789 | 6/1947 | Latham | 417/492 X |
| 3,230,892 | 1/1966 | Burns | 417/492 |

*Primary Examiner*—William L. Freeh
*Assistant Examiner*—R. E. Gluck
*Attorney, Agent, or Firm*—Bierman & Bierman

[57] ABSTRACT

A gas compressor or blower comprising a cylinder having air intake and exhaust ports; a piston which is rotatably and reciprocably movable in the cylinder; valve means for admitting air into and exhausting air from at least one chamber lying to one side of the piston; a piston shaft to which the piston is secured, the piston shaft passing through seals at the axial ends of the cylinder; means for applying a rotary drive to the piston rod; and a cam arrangement for causing reciprocation of the piston rod as this rotates; the arrangement of ports and valve means being such that as the piston rotates and reciprocates air is induced into the chamber, is compressed in the chamber and then exhausted from the chamber.

9 Claims, 12 Drawing Figures

133
220a
218
226
225
224
224
223
221

APPARATUS FOR USE AS A GAS COMPRESSOR OR BLOWER

Matter enclosed in heavy brackets [ ] appears in the original patent but forms no part of this reissue specification; matter printed in italics indicates the additions made by reissue.

This invention relates to apparatus that can be used either as a gas compressor or as a gas blower.

The invention provides a compressor or blower operating on entirely different principles to existing equipment and capable of being made more cheaply than existing equipment, with increased efficiency and less need for maintenance.

According to the present invention a gas compressor or blower comprises a cylinder having air intake and exhaust ports; a piston which is rotatably and reciprocably movable in the cylinder; valve means for admitting air into and exhausting air from at least one chamber lying to one side of the piston; a piston shaft to which the piston is secured, the piston shaft passing through seals at the axial ends of the cylinder; means for applying a rotary drive to the piston shaft; and a cam arrangement for causing reciprocation of the piston shaft as this rotates; the arrangement of ports and valve means being such that as the piston rotates and reciprocates air is induced into the chamber, is compressed in the chamber and then exhausted from the chamber.

By appropriate selection of the piston size and of the port and valve means the apparatus can be designed to act as a blower or as a compressor. By mounting two cylinders in axial alignment, and providing a single piston shaft extending through both cylinders with cam arrangements provided only at each extreme end of the assembly, it is possible to provide a two-stage compressor or twin blowers operated by only a single driven shaft. In fact, more than two cylinders can be mounted in this way to provide multi-stage apparatus with a single drive.

Preferably, valve means are provided for admitting air into and exhausting air from first and second chambers lying to opposite sides of the piston. However, it is possible to use only a single compression chamber to one end of the piston, particularly in a two-stage compressor valved so that compression occurs in one cylinder as expansion occurs in the other cylinder.

Preferably, the valve means comprise valving grooves formed in the circumference of the piston. Alternatively the valve means can comprise conventional pressure operated inlet and outlet valves in suitable positions on the cylinder or cylinders, or other valving arrangements may be employed.

Preferably, the apparatus includes means for axially balancing the piston shaft. In one embodiment this means comprises support means, and means mounting said cylinder on said support means so that said cylinder has free axial movement on said support means. Thus the piston shaft and the cylinder move oppositely and the apparatus is axially balanced. In an alternative arrangement the piston shaft is hollow and the means for axially balancing comprises a plunger suitable within said piston shaft, closed fluid-containing end chambers at each end of the piston shaft, means for controlling leakage from the chambers in response to the position of the plunger relative to the piston shaft and means for supplying make-up fluid to said end chambers. The plunger then acts as a counterbalance and any tendency for it to drift to an extreme position is compensated for by leakage of fluid from the respective end chamber to stop the drift.

Conveniently, the cam arrangement comprises a first cam at a first end of the cylinder for driving the piston shaft in a first axial direction and a second cam at a second end of the cylinder for driving the piston shaft in a second axial direction. Alternatively two opposed cams or opposed faces of a single cam may be mounted at the same end of the cylinder.

Preferably, each cam is a face cam secured to rotate with the piston shaft and bearing on roller means carried at the respective end of the cylinder, and each roller means comprises two roller assemblies bearing on a common face cam, the roller assemblies being opposed by 180° and spaced equidistantly from the centre line of the piston shaft, and both roller assemblies are mounted on a carrier which is mounted on the cylinder for pivotal movement about an axis perpendicular to the axis of the piston shaft. This ensures that no appreciable force perpendicular to the piston shaft is exerted on the piston shaft.

A similar balanced cam arrangement can be used where reciprocation is caused by two opposed cams or cam faces at the same end of the cylinder.

Preferably, the means for applying rotary drive to the piston shaft comprise projections extending axially from and spaced radially from an end member secured to the piston shaft, a drive shaft, and means rotatable with the drive shaft and bearing on the projections to drive the piston shaft in the same sense as the drive shaft while allowing axial movement of the piston shaft relative to the drive shaft, and the projections are spaced equidistantly to each side of the piston shaft and the means rotatable with the drive shaft are such as to apply equal force to each of the projections.

Thus, there is a complete absence of any significant side thrust on the piston and piston rod due to the cam arrangement and drive means. By then arranging the piston rod to run in non-lubricated or sealed bearings at the axial ends of the cylinder, and providing a very small clearance between the piston and the cylinder, the apparatus can be run entirely without lubrication within the cylinder. Thus, any gas can be compressed without danger of contamination by oil.

The invention will be better understood from the following description, given with reference to the accompanying drawings, in which.

Figure 1:
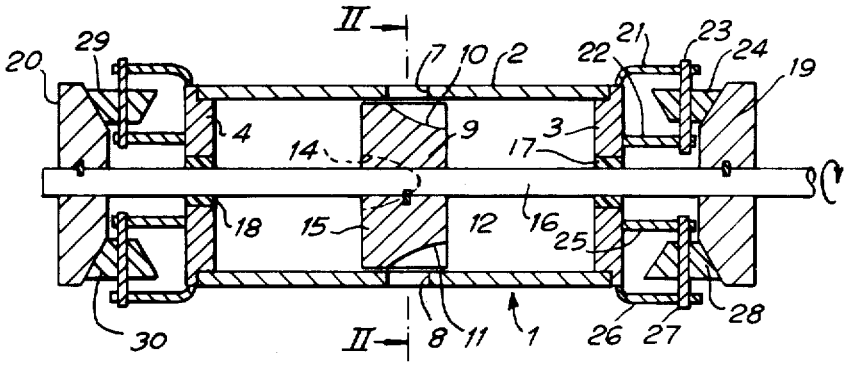
FIG. 1 shows schematically a cross-section through apparatus illustrating the principle of the invention.
Figure 2:
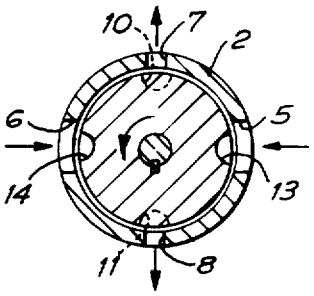
FIG. 2 is a cross-section on the line II—II of FIG. 1.
Figure 3:
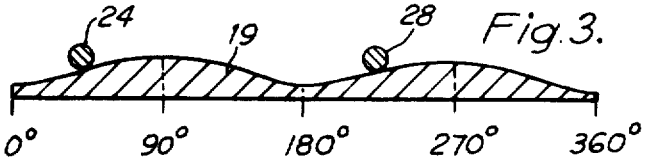
FIG. 3 shows the development of a cam surface used in the apparatus.
Figure 4:
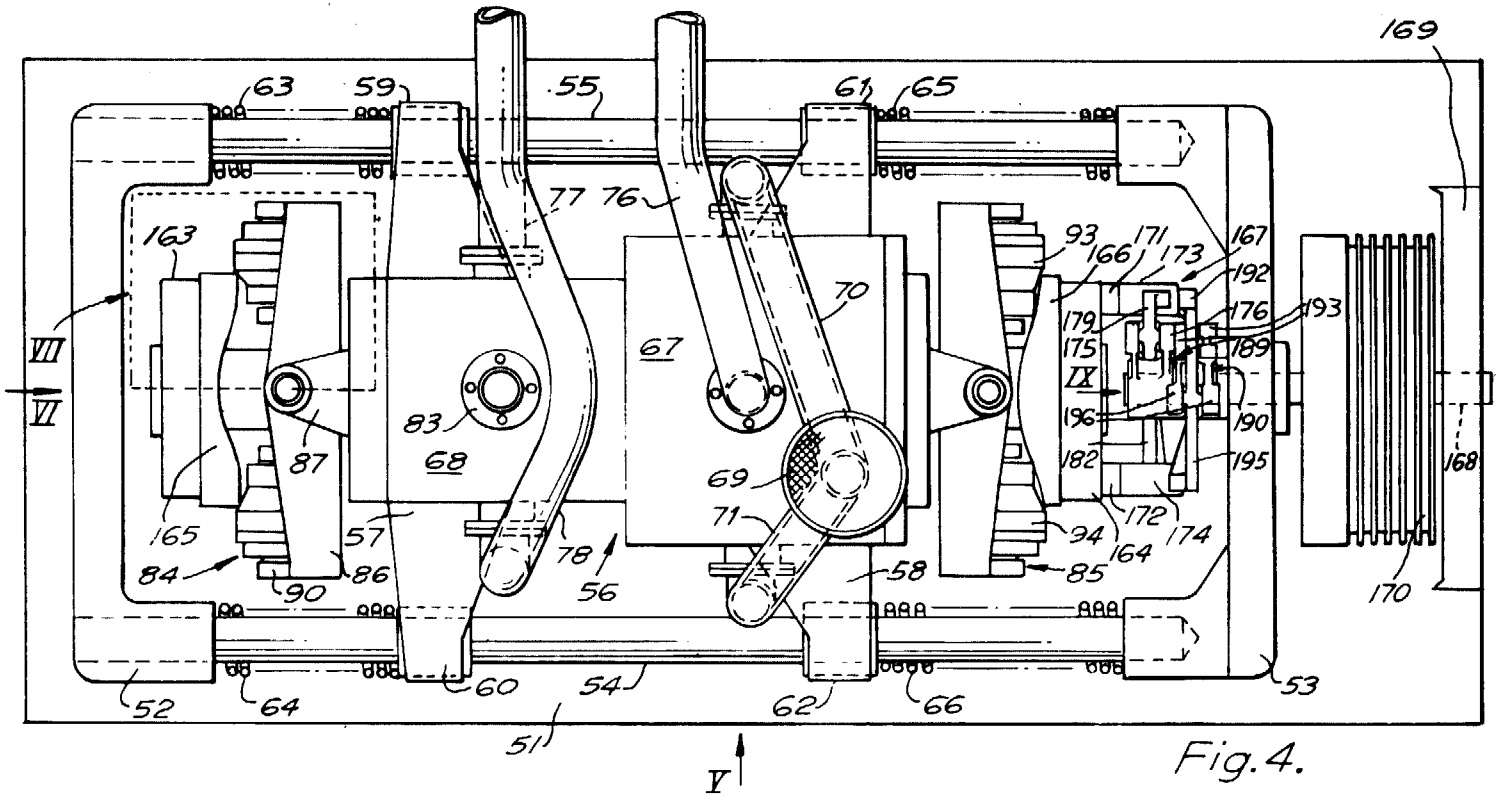
FIG. 4 is a plan view of a two-stage compressor according to the invention.
Figure 5:
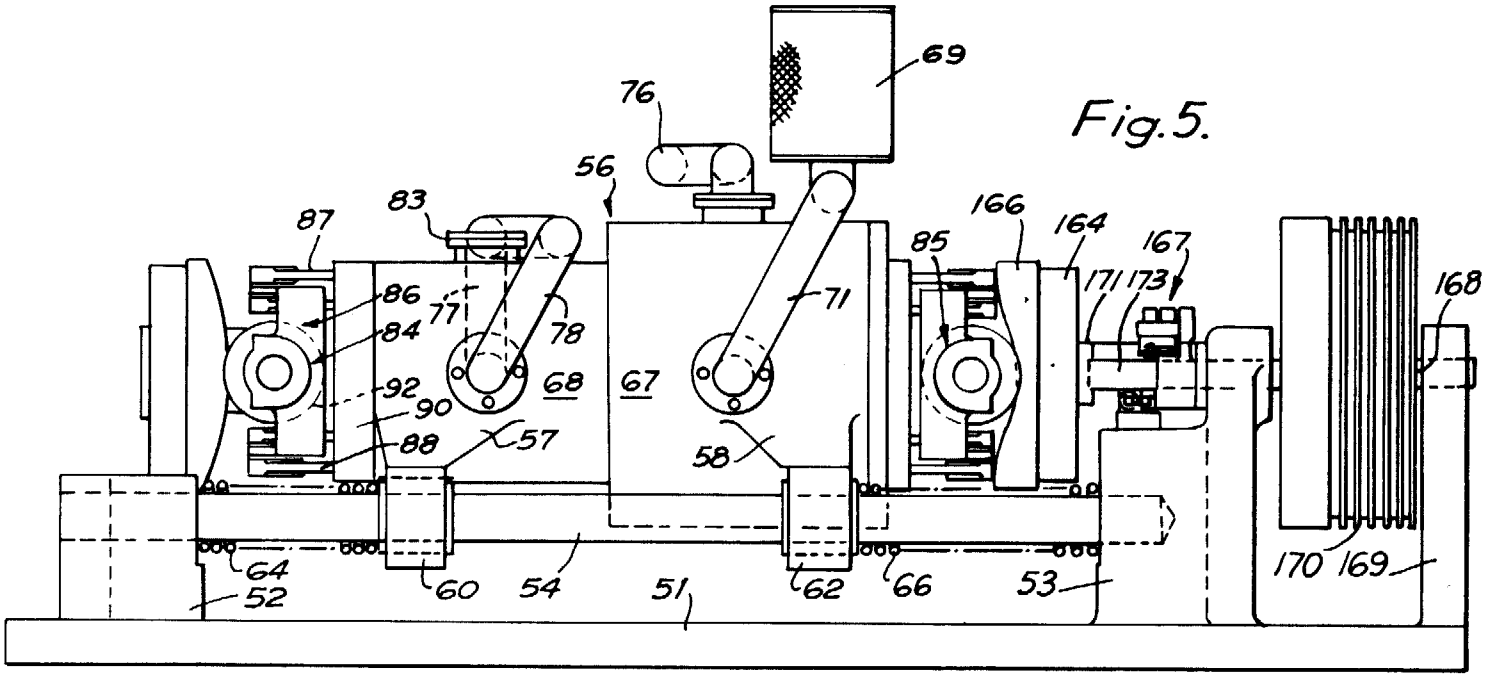
FIG. 5 is a side elevation in the direction of arrow V of FIG. 4.
Figure 6:
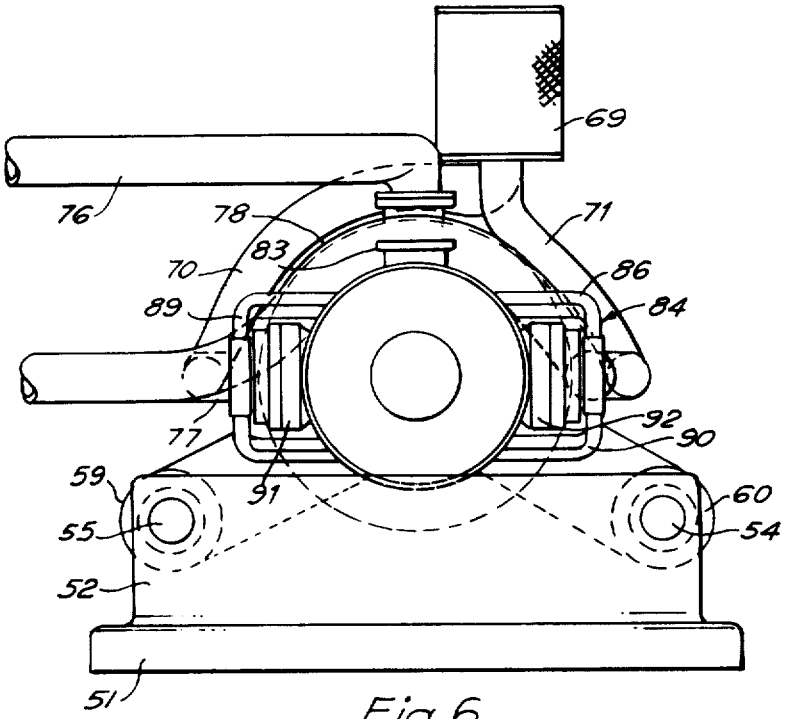
FIG. 6 is an end elevation in the direction of arrow VI of FIG. 4.
Figure 7:
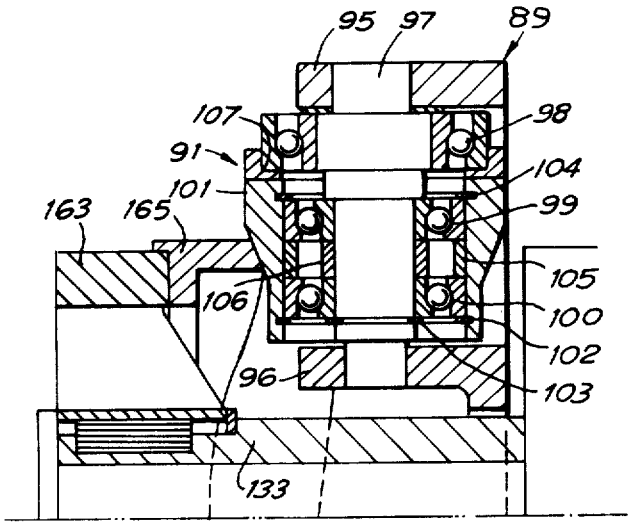
FIG. 7 is a cross-section through the part enclosed in broken lines VII in FIG. 4.

Referring now to FIGS. 1 to 3 the apparatus comprises a cylinder 1 having a barrel 2 and axial end plates 3 and 4. Formed in the wall of the barrel are two diametrically opposed intake ports 5 and 6 and two diametrically opposed exhaust ports 7 and 8, the centre line of each port lying at substantially 90° to the centre lines of the two adjacent ports.

Fitted within the cylinder barrel is a piston 9, there being a very small clearance between the piston and the barrel. The piston is formed with two diametrically opposed valving grooves 10, 11 opening into one surface 12 of the piston, and a further two diametrically opposed valving grooves 13, 14 opening into the other surface 15 of the piston. The centre lines of the valving grooves each lie at 90° to the centre lines of adjacent valving grooves.

The piston 9 is keyed to rotate with a piston rod 16 which is supported by journal or rolling bearings 17 and 18 in the end plates 3 and 4. At each end of the piston rod there is keyed thereto a contoured end cam 19 and 20 respectively, the developed contour of each cam being shown in FIG. 3. It will be seen that each cam has two diametrically opposed peaks and two diametrically opposed valleys, spaced by 90° from the peaks. The cams are mounted on the piston rod so that one is turned through 90° relative to the other, i.e. the peaks of one cam are axially aligned with the valleys of the other.

Secured to the end plate 3 of the cylinder are arms 21, 22 supporting a pin 23 about which a roller 24 is journalled for rotation, and arms 25, 26 supporting a pin 27 about which a roller 28 is journalled for rotation. The two rollers 24, 28 run in contact with the cam 19. A similar arrangement is provided at the opposite end of the cylinder, with rollers 29, 30 running in contact with cam 20.

Operation of the apparatus will readily be understood. As piston rod 16 is rotated by a drive means (not shown) the reaction between cams 19 and 20 and their respective rollers will cause the piston rod and piston to reciprocate in the cylinder. The valving grooves 10 and 11 will, when the piston is at the right hand limit of its travel uncover the intake ports 5 and 6 and gas will be induced into the cylinder to the right of the piston, induction continuing as the piston moves to the left until the valving grooves 10 and 11 have moved away from the intake ports. Also, as the piston moves to the left, air already induced to the left of the piston on the preceding rightward movement of the piston is compressed, until further rotation moves valving grooves 14 and 13 to uncover exhaust ports 7 and 8. The compressed air is thus released. It will be understood that this operation occurs twice during each revolution of the piston, in alternation with a similar inductior to the left of, and compression to the right of, the piston, the complete cycle during a 360° rotation of the piston consisting of two inductions and two compressions to each side of the piston.

The apparatus shown in FIGS. 1 to 3 has been described to show the principle of the invention, and a preferred embodiment of a two-stage compressor will now be described in detail.

The apparatus is mounted on a base 51 having two upstanding sections 52, 53 between which extend two circular cylindrical guide rods 54, 55. Mounted on the base is a cylinder assembly 56 having two mounting elements 57, 58 each with arms carrying sleeves 59, 60 and 61, 62 respectively which are slidable on the guide rods 54, 55. Compression springs 63 to 66 are mounted between the sleeves and the upstanding sections 52, 53. The cylinder assembly 56 comprises two stages, a low pressure cylinder 67 and a high pressure cylinder 68. An air intake 69 is mounted on the low pressure cylinder and flexible ducts 70, 71 lead to intake ports into low pressure cylinder 67. Exhaust ports from this cylinder communicate with a flexible duct 76 which is connected to an intercooler (not shown). From the intercooler the first stage compressed air passes through flexible ducts 77, 78 to intake ports into the high pressure cylinder 68. From exhaust ports compressed air at the required pressure is led to an outlet 83.

Mounted at each end of the cylinder assembly 56 is a roller assembly 84, 85, and as these two assemblies are identical only assembly 84 will be described in detail. The assembly comprises a carrier 86 pivotally mounted on upper and lower lugs 87, 88. The carrier has side members 89, 90 on which the rollers proper are mounted. The two rollers 91, 92 (and rollers 93, 94 of assembly 85) are identical and only roller 91 will be described in detail. The side member 89 is in the form of a yoke with arms 95, 96 between which extends a pin assembly 97 supporting the inner races of three bearings 98 to 100. A sleeve roller element 101 is supported on the outer races of the bearings. The bearings and the sleeve roller element are located in their respective positions by circlips 102 to 104, spacing sleeves 105, 106 and a shoulder 107 on the element 101.

Figure 8:
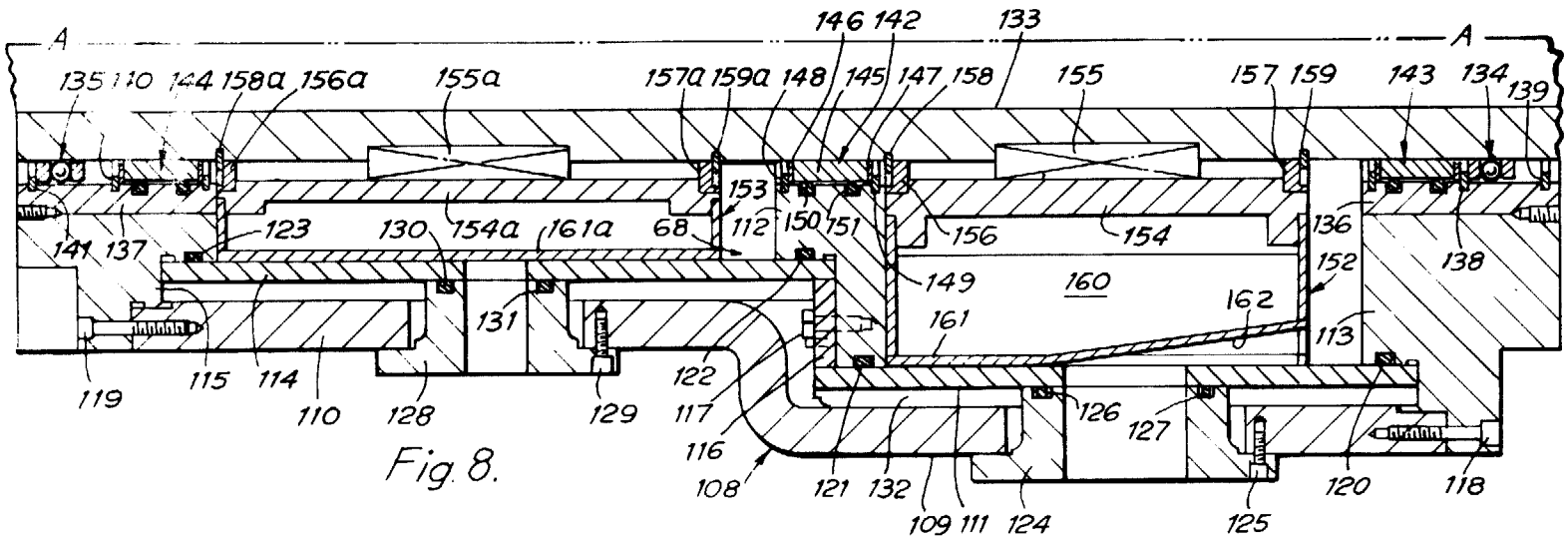
FIG. 8 is a cross-section through part of the compressor of FIG. 4.

The cylinder assembly 56 is shown in more detail in the cross-sectional view of FIG. 8. The assembly is symmetrical about the centre line A—A, so for simplicity only one half is shown in the Figure. The assembly comprises an outer casing 108, part 109 of which surrounds the low pressure cylinder and part 110 of which surrounds the high pressure cylinder. The low pressure cylinder proper is defined by a cylindrical sleeve 111 and end pieces 112 and 113. The high pressure cylinder proper is defined by a cylindrical sleeve 114 and end pieces 112 and 115. The two sleeves 111 and 114 are joined by being welded to an annulus 116 which is bolted by bolts such as 117 to the end piece 112. The end piece 113 is bolted by bolts such as 118 to casing 108, and the end piece 115 is bolted by bolts such as 119 to casing 108. Sealing rings 120 to 123 are positioned between the cylindrical sleeves and end pieces.

Four port elements (two intake and two exhaust) such as 124 are spaced at 90° intervals around the low pressure cylinder, being secured to the casing 108 by bolts such as 125. A sealing ring 126 is positioned between the port elements and the sleeve 111. Similarly, four port elements (two intake and two exhaust) such as 128 are spaced at 90° intervals around the high pressure cylinder, being secured to the casing 108 by bolts such as 129. A sealing ring 130 is positioned between the port element and the sleeve 114. The space 132 between the casing 108 and sleeve 111, 114 can be used for a flow of cooling water. In an alternative construction the casing 108 could be omitted and the cylinders defined by appropriately mounted sleeves 111, 114 provided with fins to assist air cooling.

Mounted for rotation and reciprocation within the cylinder assembly is a hollow piston shaft 133. The piston shaft is supported by two bearing assemblies 134, 135 each comprising an annular race and a number of balls equiangularly spaced around the race. In a particular construction 18 balls were used in each race. The balls run in contact with both the piston shaft 133 and a hardened liner 136, 137 respectively of end pieces 112 and 115. The bearing assembly 134 can reciprocate relative to liner 136 between limit circlips 138, 139, and the bearing assembly 135 can reciprocate relative to liner 137 between limit circlips 140, 141.

Seal assemblies 142 to 144 are positioned between the shaft 133 and the end pieces 112, 113 and 115 respectively. Each seal assembly is identical and comprises a sleeve 145 with a running clearance between itself and shaft 133 and a clearance between itself and the respective end piece, spacing washer 146, 147 to each end of the sleeve 145, circlips 148, 149 on which the spacing washers bear and soft packing rings 150, 151 between the sleeve and the respective end piece.

The shaft 133 carries two pistons 152, 153, which are both of similar construction. Piston 152 in low pressure cylinder 67 comprises a bobbin 154 keyed to rotate with shaft 133 by a key 155 and constrained to reciprocate with shaft 133 by spacer washers 156, 157 and circlips 158, 159. Welded to the bobbin 154 and to support valves 160 extending radially from the bobbin is a surface member 161 which is of general circular cylindrical form but is formed with valving grooves such as 162. A valving groove identical to groove 162 is formed on the surface member but with its centre line spaced 180° therefrom, and valving grooves similar to groove 162 but extending in the opposite direction, i.e. towards end piece 112 are formed on the surface member with the centre lines spaced 90° to either side of that of groove 162. Corresponding valving grooves of piston 153 may be angularly displaced from those of piston 152. Parts of piston 153 (in high pressure cylinder 68) corresponding to those of piston 152 are shown by the same reference numerals with the suffix a.

The piston shaft 133 has keyed and axially secured at each end thereof an end member 163, 164 to which is welded a cylindrical face cam 165, 166 having a contoured edge. The edge of cam 165 bears on the sleeve roller element 101 of roller assembly 84, and the edge of cam 166 bears on the sleeve roller element of roller assembly 85. Thus, as the shaft 133 is rotated the action of the cams 165, 166 on the roller assemblies 84, 85 will cause reciprocation of the shaft.

The shaft 133 is rotated by means of a drive transmission 167 through a shaft 168 supported in bearings in upstanding section 53 and a further upstanding section 169. The shaft 168 has secured thereto a drive pulley 170 to which drive may be transmitted from a motor (not shown).

The drive transmission includes two opposed projections 171, 172 from end member 164 of shaft 133. These projections have hardened bearing sections 173, 174 respectively. A bell crank lever 175 with first and second pairs of axially spaced arms is secured by a key to rotate with shaft 168. A lever 179 is pivotally mounted between first arms such as 180 of the bell crank lever, and a further lever 182 is pivotally mounted between second arms such as 183 of the bell crank lever. The lever 182 extends partly round shaft 168 and has a hardened tip 185 engaging a hardened pad 186 at one end of lever 179. At their non-engaging ends the levers 179, 182 each carry a rotatably mounted roller 187, 188 respectively which engage respectively the bearing sections 173, 174.

The drive transmission also includes a further bell crank lever 189 supported by bearings on shaft 168. A lever 192 is pivotally mounted between first arms such as 193 of the lever 189 and a further lever 195 is pivotally mounted between second arms such as 196 of the bell crank lever 189. The lever 195 extends partly round shaft 168 and has a hardened tip 198 engaging a hardened pad 199 at one end of lever 192. At their non-engaging ends the levers 192, 195 each carry a rotatably mounted roller 200, 201 respectively which engage respectively the bearing sections 173, 174 on the opposite sides of these to rollers 187, 188. The two bell crank levers 175 and 189 are joined by a tension spring 202.

Figure 9:
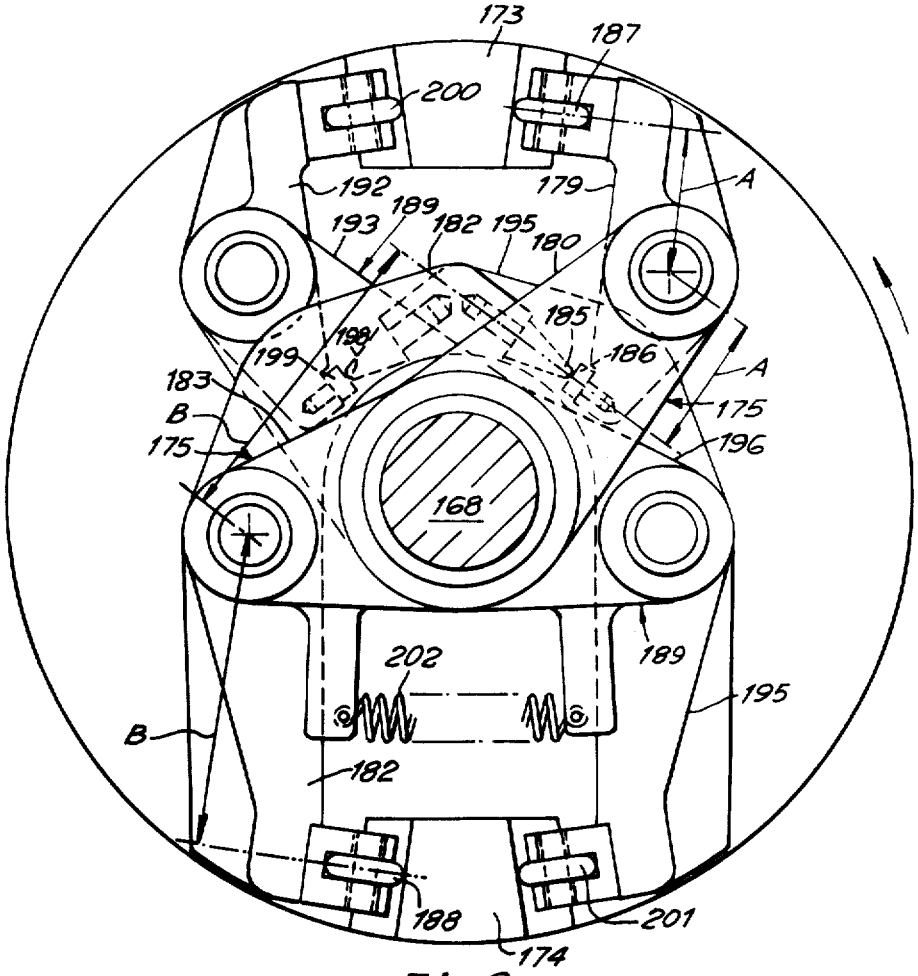
FIG. 9 is an end elevation and part section of part of the apparatus, in the direction of arrow IX of FIG. 4.

The lever systems described are such that the moment arms of lever 179, i.e. the distances from the pivot to the centre line of the roller 187 and to the point of engagement of levers 179, 182, are equal (distances A on FIG. 9), and the similar moment arms of lever 182 are equal (distances B on FIG. 9). Similar relationships apply to the moment arms of levers 192 and 195.

Operation of the apparatus will now be apparent. As shaft 168 is driven the bell crank lever 175 is driven and this in turn drives levers 179 and 182 so that rollers 187 and 188 bear on the pads 173 and 174. The equal moment arms ensure that if, during rotation of the shaft 168, the lever 179 should move roller 187 on to pad 173 before roller 188 contacts pad 174 then the contact of roller 187 will drive lever 179 about its pivot on arm 180 to cause engagement of pad 186 with tip 185 and thus drive lever 182 about its pivot on arm 175 to drive roller 188 on to pad 174. A similar effect occurs if roller 188 contacts pad 174 first, and it will thus be seen that the drive on to the projections 173, 174 is always equalised and there is no side thrust. A similar action will occur to keep rollers 200 and 201 in contact with pads 173 and 174 to prevent backlash in the drive and so give a uniform transmission.

Drive onto pads 173, 174 as described obviously drives shaft 133 to rotate this. As it rotates the face cams 165, 166 run on the roller assemblies 91 to 94 and thus cause the shaft 133 to reciprocate. Reciprocation of shaft 133 relative to drive shaft 168 is of course allowed by the rollers 187, 188, 200, 201 without affecting the rotational drive.

As the shaft 133 rotates and reciprocates the pistons 152 and 153 rotate and reciprocate in the cylinders 67 and 68. Gas is admitted to alternate sides of piston 152 in the low pressure cylinder, is compressed as described with reference to FIGS. 1 to 3 and the compressed gas is exhausted and transferred through duct 76 to the intercooler and thence to the inlet ports into the high pressure cylinder 68, where it is admitted to opposite sides of piston 153. Further compression occurs in cylinder 68 and the finally compressed gas is taken off through outlet 83. As the shaft 133 reciprocates the cylinder assembly moves oppositely on the guide rods 54, 55 so that no axial forces are transmitted to the base plate 51. Thus, there is axial balance and there is also balanced torque on to the shaft 133, so that the apparatus is free from out of balance forces.

Figure 10:
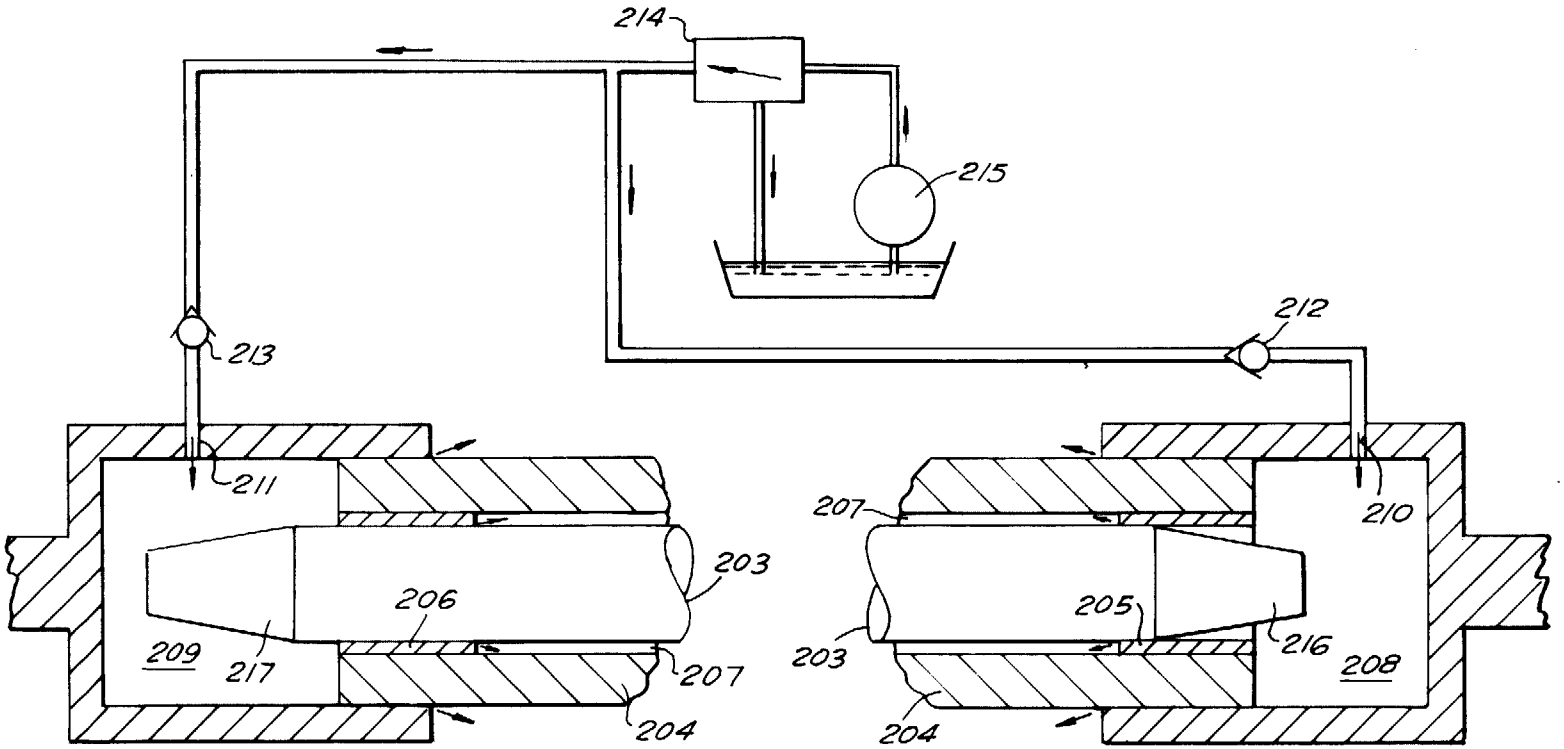
FIG. 10 is a schematic view of part of an alternative form of the apparatus.

The axial balancing obviously results in an axial vibration of the cylinder assembly which may be undesirable. FIG. 10 shows an alternative form of axial balancing which can be used with an arrangement wherein the cylinder assembly is secured to a fixed base, or which may be used in conjunction with the axially floating cylinder assembly described, whereupon axial oscillation of the cylinder assembly will be reduced.

Such a balance arrangement comprises a balance weight 203 within a hollow piston shaft 204 (equivalent to shaft 133). The balance weight is centred in shaft 204 by sleeves 205, 206 giving a running and a leakage clearance. An annular chamber 207 is defined between balance weight 203 and shaft 204. Fixed open ended cylinders 208, 209 are provided at each end of the shaft, and the shaft is free to rotate and oscillate in these cylinders, being driven as already described. Each cylinder 208, 209 has an inlet 210, 211 for fluid, which may be supplied through non-return valves 212, 213 and a pressure relief valve 214 from a pump 215. Each end of the balance weight 203 is tapered as at 216, 217.

It will be seen that as the shaft 204 moves to one side fluid is displaced in the respective cylinder to move the counterweight in the opposite direction, so balancing the axial forces. Fluid leaks past the sleeves 205, 206 into chamber 207 from where it may flow to a sump, and also past the outer surface of the piston rod to the sump. Make-up fluid is supplied to the cylinders through inlets 210, 211. If the counterweight tends to settle in a position too far to one side of the centre then the tapered end 216 or 217 will allow fluid to leak more rapidly from the cylinder 208 or 209 at the other end into the chamber 207 so that the drift is limited.

It will be evident that the principle of the invention can be extended to a compressor having three or more stages or more than one cylinder per shaft. The particular cam, drive, piston and balancing arrangements are all capable of being changed or modified as desired.

Thus, it is not necessary to have separate cam assemblies at each end of the cylinder and the piston rod may carry at or near one end thereof a cam having opposed faces. Two roller assemblies such as 84 or 85 are then pivotally mounted on a common or separate mounting to bear one on each face of the cam.

Figure 11:
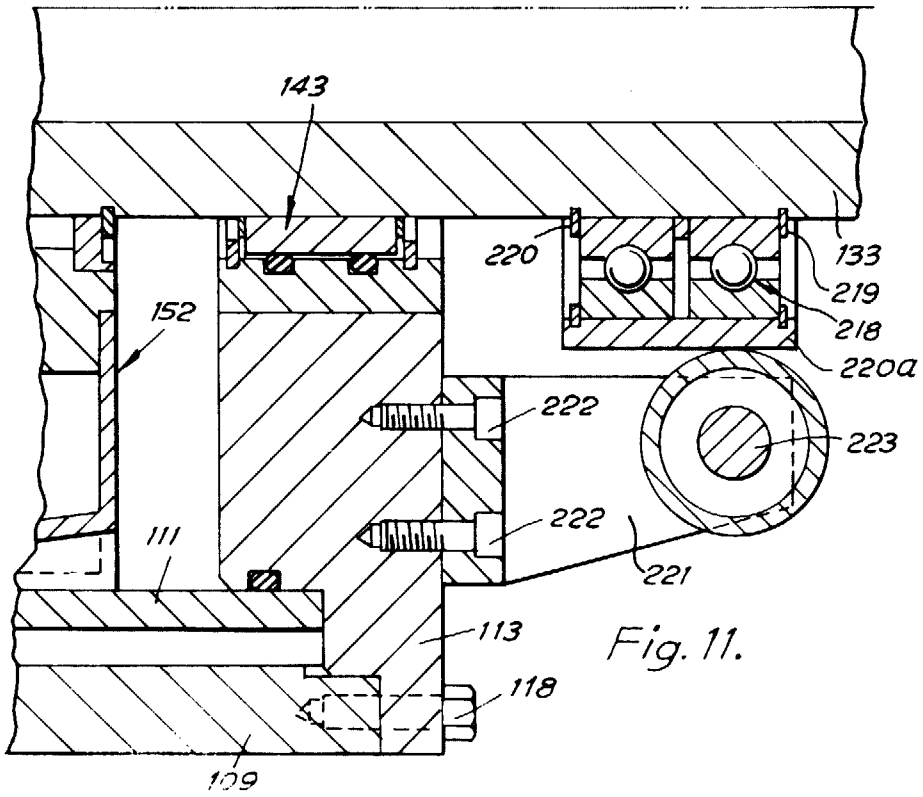
FIGS. 11 and 12 are respectively axial and radial partial sections through part of a further modified form of the apparatus.
Figure 12:
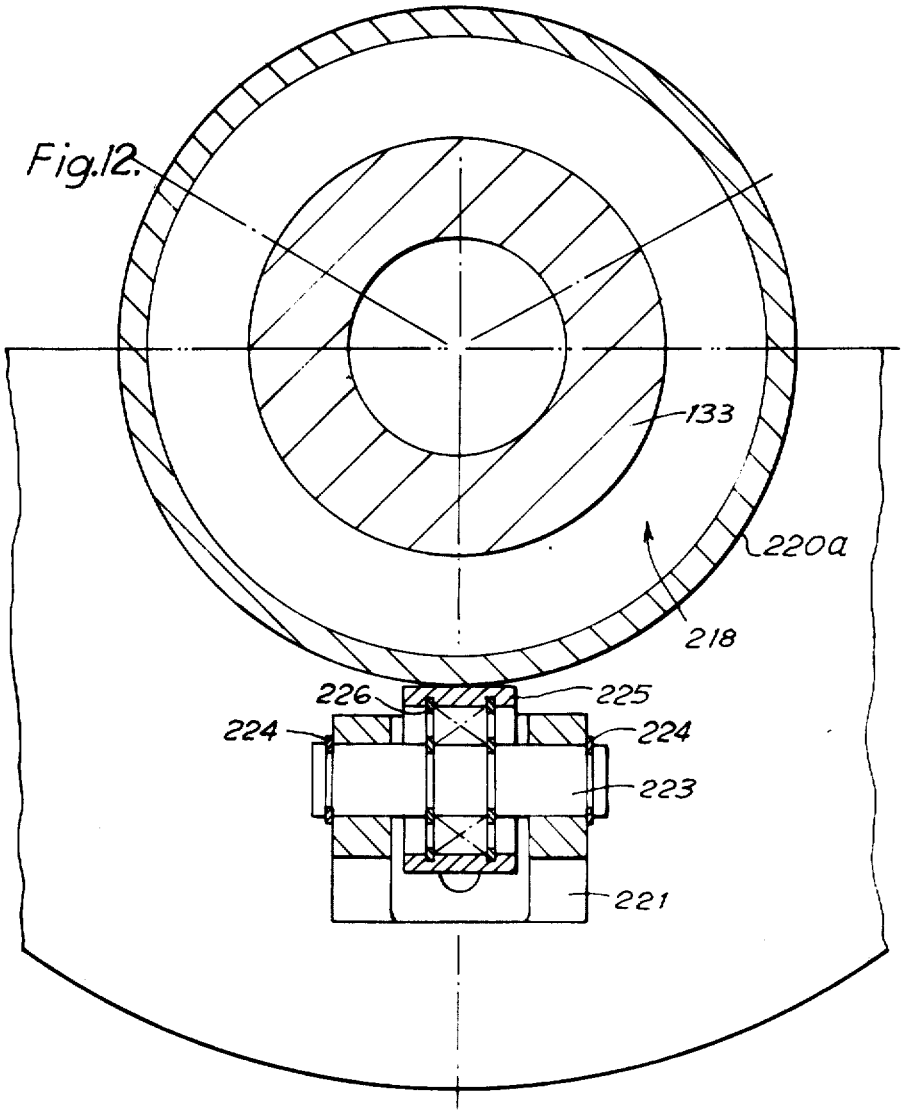

The bearing assemblies for piston shaft 133 may be replaced by the arrangement shown in FIGS. 11 and 12. In this arrangement the piston shaft 133 has a ball bearing 218 axially secured thereto by circlips 219, 220 and lying outside the end piece 113 of the cylinder assembly. The outer race of bearing 218 has a hardened sleeve 220a which is supported by three follower assemblies equally spaced 120° apart round the shaft. Each follower assembly has a carrier 221 secured by bolts 222 to the end piece 113 and forming a yoke. A spindle 223 is mounted to extend between the arms of the yoke and is located by circlips 224. A hardened sleeve follower 225 is rotatably supported by a bearing 226 on spindle 223 and engages sleeve 220a. It will be seen that bearing 218 allows the shaft 133 to rotate and the follower assemblies allow the bearing to reciprocate relative to the cylinder assembly.

Obviously heat is generated during operation and it is important that the piston should not expand so far relative to the cylinder that it seizes up. Sufficient clearance can be left to ensure that this does not occur but this may impair the efficiency of the apparatus. A heater, which may be electrical or of a fluid circulation type, may be applied to the outer surfaces of the sleeves 111, 114 to ensure that these expand more than the pistons. Alternatively the material of the pistons may be chosen to have a lower coefficient of expansion than the material of the sleeves.

Further changes or modifications are possible.

What I claim is:

1. A gas compressor or blower comprising a cylinder having air intake and exhaust ports; a piston which is rotatably and reciprocably movable in the cylinder; valve means for admitting air into and exhausting air from at least one chamber lying to one side of the piston; a piston shaft to which the piston is secured, the piston shaft passing through seals at the axial ends of the cylinder; means for applying a rotary drive to the piston [rod] *shaft*; and a cam arrangement for causing reciprocation of the piston [rod] *shaft* as it rotates; the arrangement of ports and valve means being such that as the piston rotates and reciprocates air is induced into the chamber, is compressed in the chamber and then exhausted from the chamber; means for axially balancing the piston shaft comprising support means, and means for mounting said cylinder on said support means so that said cylinder has free axial movement on said support means.

2. A gas compressor or blower comprising a cylinder having air intake and exhaust ports; a piston which is rotatably and reciprocably movable in the cylinder; valve means for admitting air into and exhausting air from at least one chamber lying to one side of the piston; a piston shaft to which the piston is secured, the piston shaft passing through seals at the axial ends of the cylinder; means for applying a rotary drive to the piston [rod] *shaft*; and a cam arrangement for causing reciprocation of the piston [rod] *shaft* as it rotates; the arrangement of ports and valve means being such that as the piston rotates and reciprocates air is induced into the chamber, is compressed in the chamber and then exhausted from the chamber; said cam arrangement comprising a first cam at a first end of the cylinder for driving the piston shaft in a first axial direction and a second cam at a second end of the cylinder for driving the piston shaft in a second axial direction, each cam being a face cam secured to rotate with the piston shaft and bearing on roller means carried at the respective end of the cylinder, each said roller means comprising two roller assemblies bearing on a common face cam, the roller assemblies being opposed by 180° and spaced equidistantly from the center line of the piston shaft, and both roller assemblies mounted on a carrier which is mounted on the cylinder for pivotal movement about an axis perpendicular to the axis of the piston shaft.

3. A gas compressor or blower comprising a cylinder having air intake and exhaust ports; a piston which is rotatably and reciprocably movable in the cylinder; valve means for admitting air into and exhausting air from at least one chamber lying to one side of the piston; a piston shaft to which the piston is secured, the piston shaft passing through seals at the axial ends of the cylinder; means for applying a rotary drive to the piston [rod] *shaft*; and a cam arrangement for causing reciprocation of the piston [rod] *shaft* as it rotates; the arrangement of ports and valve means being such that as the piston rotates and reciprocates air is induced into the chamber, is compressed in the chamber and then exhausted from the chamber; the means for applying rotary drive to the piston shaft comprising projections extending axially from and spaced radially from an end member secured to the piston shaft, a drive shaft, and means rotatable with the drive shaft and bearing on the projections to drive the piston shaft in the same sense as the drive shaft while allowing axial movement of the piston shaft relative to the drive shaft; said projections spaced equidistantly to each side of the piston shaft and the means rotatable with the drive shaft applies equal force to each of the projections and comprises a bell crank lever, a first lever having a first end and a second end and pivoted to a first arm of the bell crank lever and bearing at said first end on a first one of said projections, a second lever having a first end and a second end and pivoted to a second arm of the bell crank lever and bearing at a first end on a second one of said projections, said first and second levers bearing against each other at said second ends, the moment arm from the pivot point of each lever to its point of contact with the respective projection being equal to the moment arm from said pivot point to the point of contact with the other lever.

*4. A gas compressor or blower comprising a cylinder having gas intake and exhaust ports; a piston which is rotatably and reciprocably movable in the cylinder; valve means for admitting gas into and exhausting gas from at least one chamber lying to one side of the piston; a piston shaft to which the piston is secured, the piston shaft passing through seals at the axial ends of the cylinder; means for applying a rotary drive to the piston shaft; and a cam arrangement for causing reciprocation of the piston shaft as it rotates; the arrangement of ports and valve means being such that as the piston rotates and reciprocates, gas is induced through the intake ports into the chamber, is compressed in the chamber and then exhausted from the chamber through the exhaust ports, said cam arrangement comprising a first cam for driving the piston shaft in a first axial direction and a second cam for driving the piston shaft in a second axial direction, each cam being a face cam secured to rotate with the piston shaft and bearing on roller means comprising two roller assemblies opposed by 180° and spaced equidistantly from the center line of the piston shaft, and a carrier on which both roller assemblies are mounted and which is mounted on the cylinder for pivotal movement about an axis perpendicular to the axis of the piston shaft.*

*5. A gas compressor or blower comprising a cylinder having gas intake and exhaust ports; a piston which is rotatably and reciprocably movable in the cylinder; valve means for admitting gas into and exhausting gas from at least one chamber lying to one side of the piston; a piston shaft to which the piston is secured; the piston shaft passing through seals at the axial ends of the cylinder; means for applying a rotary drive to the piston shaft; and a cam arrangement for causing reciprocation of the piston shaft as it rotates; the arrangement of ports and valve means being such that as the piston rotates and reciprocates, gas is induced through the intake ports into the chamber, is compressed in the chamber and then exhausted from the chamber through the exhaust ports; the means for applying rotary drive to the piston shaft comprising a first projection having a first bearing surface, a second projection having a second bearing surface, the two projections being fixed to rotate with the piston shaft and said bearing surfaces being spaced equidistantly to each side of the piston shaft and facing in the same sense of rotation; a drive shaft and means rotatable with the drive shaft and bearing on the respective bearing surfaces to drive the piston shaft in the same sense as the drive shaft while allowing axial movement of the piston shaft relative to the drive shaft; said means rotatable with the drive shaft comprising a bell crank lever secured to the drive shaft, a first lever pivoted to a first arm of the bell crank lever and bearing at a first end on the first bearing surface, a second lever pivoted to a second arm of the bell crank lever and bearing at a first end on the second bearing surface, said first and second levers bearing against each other at their second ends, the moment arm from the pivot point of each lever to its point of contact with the respective projection being equal to the moment arm from said pivot to the joint of contact with the other lever.*

*6. A gas compressor or blower according to claim 5 in which the means rotatable with the drive shaft further comprises a second bell crank lever journalled on the drive shaft, a third lever pivoted to a first arm of the second bell crank lever and bearing at a first end on a third bearing surface on a projection fixed to rotate with the piston shaft, a fourth lever pivoted to a second arm of the second bell crank lever and bearing at a first end on a fourth bearing surface on a projection fixed to rotate with the piston shaft, the third and fourth bearing surfaces facing in the opposite sense of rotation to the first and second bearing surfaces, said third and fourth levers bearing against each other at their second ends, the moment arm from the pivot point of each of the third and fourth levers at its point of contact with the respective projection being equal to the moment arm from said pivot point to the point of contact with the other one of the third and fourth levers.*

*7. A gas compressor or blower according to claim 6 in which the first and third bearing surfaces are on opposite sides of said first projection and said second and fourth bearing surfaces are on opposite sides of said second projection.*

*8. A gas compressor or blower according to claim 6 further including means for biasing the two bell crank levers in opposite senses of rotation that will in each case bias the first ends of the associated levers towards the respective bearing surfaces.*

*9. A gas compressor or blower according to claim 8 in which the biasing means is a tension spring extending between respective ones of said arms of the two bell crank levers.*

* * * * *